(12) United States Patent
Lortz et al.

(10) Patent No.: US 8,562,733 B2
(45) Date of Patent: Oct. 22, 2013

(54) ALUMINIUM OXIDE DISPERSION

(75) Inventors: Wolfgang Lortz, Waechtersbach (DE);
Christoph Batz-Sohn, Hanau (DE);
Gabriele Perlet, Grosskrotzenburg (DE);
Heinz Lach, Rodenbach (DE); Werner Will, Gelnhausen (DE)

(73) Assignee: Evonik DEGUSSA GmbH, Duesseldorf (DE)

( * ) Notice: Subject to any disclaimer, the term of this patent is extended or adjusted under 35 U.S.C. 154(b) by 844 days.

(21) Appl. No.: 11/994,416

(22) PCT Filed: Jun. 9, 2006

(86) PCT No.: PCT/EP2006/063047
§ 371 (c)(1),
(2), (4) Date: Jan. 2, 2008

(87) PCT Pub. No.: WO2007/006614
PCT Pub. Date: Jan. 18, 2007

(65) Prior Publication Data
US 2008/0264299 A1    Oct. 30, 2008

(30) Foreign Application Priority Data
Jul. 12, 2005   (DE) .......................... 10 2005 032 427

(51) Int. Cl.
*C09D 1/00* (2006.01)
(52) U.S. Cl.
USPC ..................................................... 106/286.5
(58) Field of Classification Search
USPC ..................................................... 106/286.5
See application file for complete search history.

(56) References Cited

U.S. PATENT DOCUMENTS

| | | | | |
|---|---|---|---|---|
| 3,825,438 | A * | 7/1974 | Pritchard | ....................... 427/218 |
| 4,216,111 | A * | 8/1980 | Thompson | ................. 252/301.23 |
| 4,378,441 | A * | 3/1983 | Blount | ........................... 521/154 |
| 6,476,083 | B1 | 11/2002 | Okura et al. | |
| 6,641,870 | B2 | 11/2003 | Bartkowiak et al. | |
| 6,663,683 | B2 | 12/2003 | Lortz et al. | |
| 6,676,719 | B2 | 1/2004 | Lortz et al. | |
| 6,764,980 | B2 * | 7/2004 | Bates et al. | ...................... 507/90 |

(Continued)

FOREIGN PATENT DOCUMENTS

| | | |
|---|---|---|
| CN | 1513924 A | 7/2004 |
| CN | 1564784 A | 1/2005 |

(Continued)

OTHER PUBLICATIONS

Somasundaram, Encylopedia of Surfaces and Colloid Science, ISBN 0849395747, p. 5316.*

(Continued)

*Primary Examiner* — Bijay Saha
(74) *Attorney, Agent, or Firm* — Oblon, Spivak, McClelland, Maier & Neustadt, L.L.P.

(57) ABSTRACT

Aluminum oxide dispersion, which is stable in a pH range 5 from 5 to 9 and has an aluminum oxide content of at least 40 wt. %, obtainable by dispersing pyrogenically produced aluminum oxide particles in an aqueous phase, wherein one or several at least dibasic hydroxycarboxylic acids present dissolved in the dispersion and at least one salt of a 10 dialkali metal hydrogen phosphate and/or alkali metal dihydrogen phosphate are added to the aqueous phase each mutually independently in a quantity of $0.3-3 \times 10^{-6}$ mol/m2 of aluminum oxide specific surface area.

18 Claims, 2 Drawing Sheets

(56) References Cited

U.S. PATENT DOCUMENTS

Figure 1:
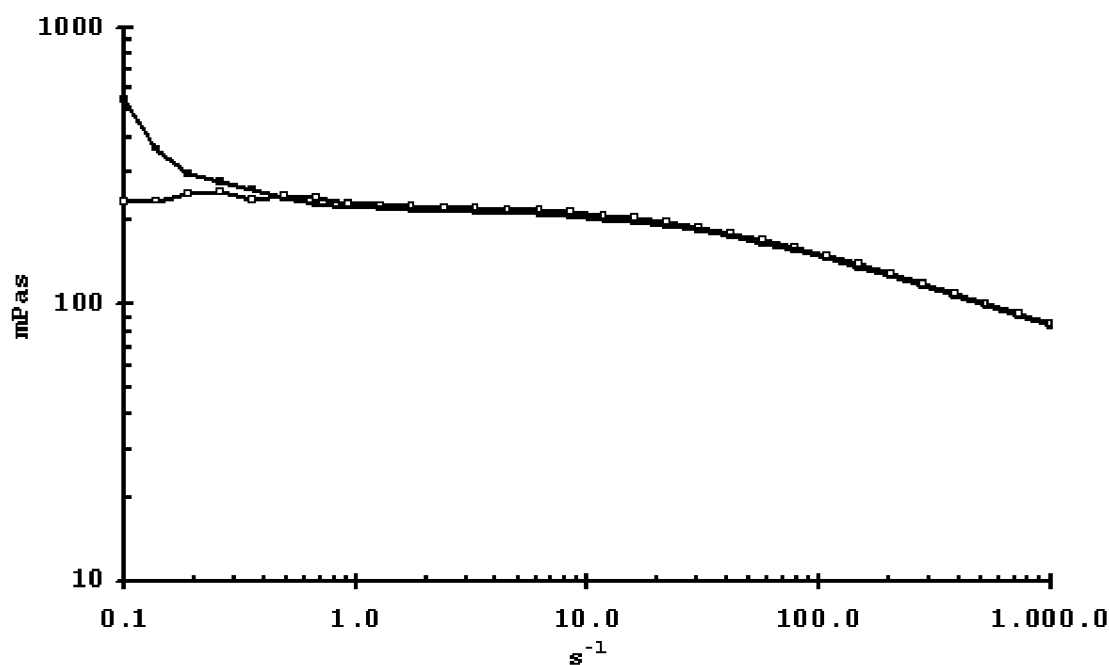

| | | | |
|---|---|---|---|
| 6,767,377 B2 | 7/2004 | Schumacher et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,893,476 B2 * | 5/2005 | Siddiqui et al. | 51/307 |
| 6,905,632 B2 | 6/2005 | Lortz et al. | |
| 6,991,190 B2 | 1/2006 | Lortz et al. | |
| 7,015,270 B2 | 3/2006 | Scharfe et al. | |
| 7,083,769 B2 | 8/2006 | Moerters et al. | |
| 7,169,322 B2 | 1/2007 | Menzel et al. | |
| 7,244,302 B2 | 7/2007 | Schumacher et al. | |
| 7,255,735 B2 | 8/2007 | Meyer et al. | |
| 7,374,787 B2 | 5/2008 | Lortz et al. | |
| 7,399,487 B2 | 7/2008 | Batz-Sohn et al. | |
| 7,411,024 B2 * | 8/2008 | Krupinski | 525/192 |
| 7,470,423 B2 | 12/2008 | Lortz et al. | |
| 7,572,854 B2 | 8/2009 | Schneider et al. | |
| 7,615,577 B2 | 11/2009 | Lortz et al. | |
| 7,645,335 B2 | 1/2010 | Lortz et al. | |
| 7,749,322 B2 | 7/2010 | Schumacher et al. | |
| 7,781,520 B2 | 8/2010 | Standke et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 8,039,110 B2 | 10/2011 | Jenkner et al. | |
| 8,101,682 B2 | 1/2012 | Standke | |
| 8,119,730 B2 | 2/2012 | Edelmann et al. | |
| 8,147,918 B2 | 4/2012 | Standke et al. | |
| 8,188,266 B2 | 5/2012 | Edelmann et al. | |
| 2002/0197311 A1 | 12/2002 | Hasenzahl et al. | |
| 2003/0108580 A1 | 6/2003 | Hasenzahl et al. | |
| 2003/0228271 A1 | 12/2003 | Batz-Sohn et al. | |
| 2004/0034180 A1 * | 2/2004 | Petela et al. | 526/201 |
| 2004/0131403 A1 * | 7/2004 | Nakamura et al. | 399/341 |
| 2004/0240062 A1 | 12/2004 | Lortz et al. | |
| 2005/0169861 A1 * | 8/2005 | Lortz et al. | 424/63 |
| 2005/0265934 A1 | 12/2005 | Schumacher et al. | |
| 2006/0104881 A1 | 5/2006 | Lortz et al. | |
| 2006/0159635 A1 | 7/2006 | Meyer et al. | |
| 2006/0159636 A1 | 7/2006 | Meyer et al. | |
| 2006/0159637 A1 | 7/2006 | Meyer et al. | |
| 2006/0163533 A1 | 7/2006 | Batz-Sohn et al. | |
| 2006/0193764 A1 | 8/2006 | Katusic et al. | |
| 2006/0229210 A1 | 10/2006 | Neugebauer et al. | |
| 2006/0292192 A1 | 12/2006 | Hasenzahl et al. | |
| 2007/0048205 A1 | 3/2007 | Katusic et al. | |
| 2007/0231280 A1 | 10/2007 | Schumacher et al. | |
| 2007/0297998 A1 | 12/2007 | Meyer et al. | |
| 2008/0051473 A1 | 2/2008 | Lortz et al. | |
| 2008/0058489 A1 | 3/2008 | Edelmann et al. | |
| 2008/0095724 A1 | 4/2008 | Hasenzahl et al. | |
| 2008/0098932 A1 | 5/2008 | Perlet et al. | |
| 2008/0187673 A1 | 8/2008 | Standke et al. | |
| 2008/0206572 A1 | 8/2008 | Edelmann et al. | |
| 2008/0213325 A1 | 9/2008 | Schumacher et al. | |
| 2008/0249237 A1 | 10/2008 | Hager et al. | |
| 2008/0264299 A1 | 10/2008 | Lortz et al. | |
| 2009/0005518 A1 | 1/2009 | Just et al. | |
| 2009/0007818 A1 | 1/2009 | Militz et al. | |
| 2009/0030162 A1 | 1/2009 | Mueh et al. | |
| 2009/0047225 A1 | 2/2009 | Hasenzahl et al. | |
| 2009/0131694 A1 | 5/2009 | Schumacher et al. | |
| 2009/0186053 A1 | 7/2009 | Meyer et al. | |
| 2009/0261309 A1 | 10/2009 | Lortz et al. | |
| 2010/0117021 A1 | 5/2010 | Batz-Sohn et al. | |
| 2010/0119851 A1 | 5/2010 | Giessler-Blank et al. | |
| 2010/0159144 A1 | 6/2010 | Standke et al. | |
| 2010/0191001 A1 | 7/2010 | Wassmer et al. | |
| 2010/0209339 A1 | 8/2010 | Schumacher et al. | |
| 2010/0209719 A1 | 8/2010 | Borup et al. | |
| 2010/0233392 A1 | 9/2010 | Batz-Sohn et al. | |
| 2010/0308287 A1 | 12/2010 | Lortz et al. | |
| 2011/0143147 A1 | 6/2011 | Edelmann et al. | |
| 2011/0144226 A1 | 6/2011 | Spyrou et al. | |
| 2011/0259240 A1 | 10/2011 | Jenkner et al. | |
| 2011/0268899 A1 | 11/2011 | Albert et al. | |
| 2012/0006228 A1 | 1/2012 | Scharfe et al. | |
| 2012/0037040 A1 | 2/2012 | Standke et al. | |

FOREIGN PATENT DOCUMENTS

| | | | |
|---|---|---|---|
| GB | 1 529 771 | | 10/1978 |
| JP | 2003-517993 | | 6/2003 |
| JP | 2005 132949 | * | 5/2004 |
| JP | 2005-506269 | | 3/2005 |
| JP | 2005 132949 | * | 5/2005 |
| WO | 01/45838 A1 | | 6/2001 |
| WO | 03/035552 A2 | | 5/2003 |

OTHER PUBLICATIONS

Hidber, Jour Ame Ceramic Soc, 79, 7 pages 1857-1867.*
Hidber et al, J. Amer Cera Soc, 79)7), 1857-1867.*
Somasundaram, Ency Surf Colloid Sc, Mercel Dekker, 2004.*
The Influence of Ph on Zeta Potential, Google, 1 page.*
Hidber et al, "Citric Acid—A Dispersant fro Aqueous Alumina Suspensions", J. Am. Ceram. Soc. 79[7], 1857-1867 (1996).*
Somasundaram, "Encyclopedia of Surfaces and Colloid Science" ISBN 0849395747, p. 5316, 2004.*
Google on Line, "The Influence of pH on Zeta Potential", © 2001-2005.*
Pirmin C. Hidber, et al., "Citric Acid—A Dispersant for Aqueous Alumina Suspensions", Journal of the American Ceramic Society, vol. 79, No. 7, XP 002395724, pp. 1857-1867, Sections 1, 2, 3, 1996.
Hidber P C, et al., "Influence of the Dispersant Structure on Properties of Electrostatically Stabilized Aqueous Alumina Suspensions", Journal of the European Cenramic Society, vol. 17, No. 2, XP 004014786, pp. 239-249, section 1, 2.1, 3.2, 1997.
U.S. Appl. No. 60/405,739, filed Aug. 26, 2002, Lortz, et al.
U.S. Appl. No. 11/722,122, filed Jun. 19, 2007, Oswald, et al.
U.S. Appl. No. 12/097,300, filed Jun. 13, 2008, Lortz, et al.
U.S. Appl. No. 11/910,668, filed Mar. 8, 2006, Kroll, et al.
U.S. Appl. No. 60/708,401, filed Aug. 16, 2005, Katusic, et al.
U.S. Appl. No. 60/940,908, filed May 30, 2007, Kroell, et al.
U.S. Appl. No. 12/271,414, Nov. 14, 2008, Wursche, et al.
Taiwan IPO Search Report issued Aug. 6, 2010, Taiwan Patent Application No. 095124846 filed Jul. 7, 2006.
Notification of Reasons for Refusal issued Jan. 28, 2011, in Jjapanese Patent Application No. 2008-520820, filed Jun. 9, 2006 (English translation only).

* cited by examiner

ALUMINIUM OXIDE DISPERSION

The invention relates to a stable, aqueous aluminium oxide dispersion of high fill factor, a process for production thereof and use thereof.

From EP-A-1258458, an aqueous dispersion of pyrogenically produced aluminium oxide with a BET surface area of 100+/−15 m²/g is known. The pH of the dispersion can be varied in a range between 2 and 8 by addition of acids or bases, the content of aluminium oxide can be about 30+/−20 wt. %. From WO 03/035552, an aqueous dispersion of pyrogenically produced aluminium oxide with a BET surface area of more than 115 m²/g and a Sears number of more than 8 ml/2 g is known.

A disadvantage with the said dispersions is their low stability against sedimentation and reagglomeration. These dispersions attain their maximal stability at an aluminium oxide content of less than 30 wt. %, wherein, however, markedly acidic pH values of <5 must be present.

In certain use fields, for example in the production of lacquers, this pH range is as a rule not desirable, since recipes are often standardised in a pH range around the neutral point. However in this pH range an $Al_2O_3$ dispersion is no longer stable since the zeta potential is low (isoelectric point at ca. pH 10).

Furthermore, other particles dispersed in aqueous paint/lacquer recipes often have a negative surface charge. Such negatively charged particles would immediately coagulate with the still positively charged aluminium oxide particles and make the dispersion unusable.

However, aluminium oxide has interesting properties for applications in the paint/lacquer field, such as high hardness and a high refractive index, compared to silicon dioxide.

Particularly desirable in the field of scratch resistant lacquers are high fill factors with good workability, i.e. low viscosity, of the dispersion.

In the polishing field, in particular chemical-mechanical polishing, aluminium oxide is used as an abrasive material. Here it is of particular importance that these particles leave no scratches on the surface to be polished. This can for example be caused by a few coarse particles in a dispersion.

There was thus the problem of providing a dispersion which in a weakly acidic to weakly basic pH range has high stability, a high solids content, good workability in the form of low viscosity and is free from coarse particles. Further, there was the problem of providing a process for the production of this dispersion.

An object of the invention is an aluminium oxide dispersion which is stable in a pH range from 5 to 9 and has an aluminium oxide content of at least 40 wt. %, obtainable by dispersing one or several aluminium oxide powders with a specific surface area of 5 to 200 m²/g in an aqueous phase, wherein one or several at least dibasic hydroxycarboxylic acids present dissolved in the dispersion and at least one salt of a dialkali metal hydrogen phosphate and/or alkali metal dihydrogen phosphate each mutually independently are added to the aqueous phase in a quantity of $0.3-3\times10^{-6}$ mol/m² specific aluminium oxide surface area.

Stable in the sense of the invention should be understood to mean stability against sedimentation and reagglomeration with a period of 1 month, as a rule of at least 6 months.

Preferably, the aluminium oxide dispersion according to the invention can contain aluminium oxide powder of pyrogenic origin. Here pyrogenic should be understood to mean that this aluminium oxide powder is obtained by conversion of a suitable starting material in a flame. Pyrogenic processes include flame oxidation and flame hydrolysis. For the large-scale industrial production of aluminium oxide, the flame hydrolysis of aluminium chloride in a hydrogen/oxygen flame is mainly used. As a rule, aluminium oxide particles produced in this way are in the form of aggregated primary particles, wherein the primary particles are free from pores and bear hydroxyl groups on their surface. In the conversion of aluminium chloride to aluminium oxide, hydrochloric acid is formed as a by-product, and adheres to the aluminium oxide particles. Usually, a major part of the hydrochloric acid is removed from the particles by a steam treatment. An aluminium oxide powder in a 4 percent dispersion in water then as a rule exhibits a pH value of 3 to 5. Suitable aluminium oxide powders can be AEROXIDE® Alu C, AEROXIDE® Alu 65, AEROXIDE® Alu 130, all Degussa AG, SpectrAl™ 100 Fumed Alumina, SpectrAl™ 51 Fumed Alumina, SpectrAl™ 81 Fumed Alumina, all Cabot Corp.

Further, it can be advantageous if the aluminium oxide particles in the dispersion according to the invention have a mean aggregate diameter of less than 100 nm.

Further, it can be advantageous if the dispersion according to the invention is free from particles with a diameter of more than 1 μm.

Preferably, the aluminium oxide content can be 40 to 60 wt. %. With a high solids content, the dispersion according to the invention in this range shows a low viscosity with at the same time high stability.

Further, the pH of the dispersion according to the invention can preferably be 6 to 8. In this range, the dispersion displays a low viscosity with at the same time high stability of the dispersion.

The zeta potential of the dispersion according to the invention is preferably lower than −15 mV. Particularly preferable is a zeta potential in the range from −25 to −40 mV. The zeta potential is a measure of the surface charge of the particles, which can be shifted by substances which deposit on the surface. Zeta potential should be understood to mean the potential at the shear plane within the electrochemical double layer aluminium oxide particles/electrolyte in the dispersion. An important quantity in connection with the zeta potential is the isoelectric point (IEP). The IEP states the pH value at which the zeta potential is zero. With aluminium oxide, the IEP is at a pH of ca. 9 to 10. The greater the difference between the pH of the dispersion and the IEP, the more stable is the dispersion. The zeta potential can for example be determined by measurement of the colloid vibration current (CVI) of the dispersion or by determination of the electrophoretic mobility.

The at least dibasic hydroxycarboxylic acids added to the aqueous phase, and present dissolved in the dispersion, can preferably be citric acid or tartaric acid.

A further object of the invention is a process for the production of the dispersion according to the invention wherein
one or several at least dibasic hydroxycarboxylic acids, present dissolved in the dispersion and at least one salt of a dialkali metal hydrogen phosphate and/or alkali metal dihydrogen phosphate and in a quantity of $0.3-3\times10^{-6}$ mol/m² specific surface area are first placed in water,
the aluminium oxide particles, corresponding to the desired quantity in the dispersion are added all at once in portions or continuously,
and dispersed by an energy input of more than 1000 KJ/m³.

Suitable dispersion units can be: planet kneaders, rotor-stator machines, an agitating ball mill or a cylinder mill. A process wherein the dispersion is first performed with an energy input of less than 1000 kJ/m³ with the formation of a predispersion, the predispersion is divided into at least two part streams, these part streams are placed in a high energy mill under a pressure of at least 500 bar, released via a nozzle and allowed to impinge on one another in a gas- or liquid-filled reaction chamber, and the high energy grinding is optionally repeated once or several times, has been found to be particularly suitable.

A further object of the invention is the use of the dispersion for the coating of glass, ceramic and metal surfaces and for the production of lacquers.

EXAMPLES

Analytical Procedures

The viscosity is determined with an MCR300 instrument with CC27 measuring system, Parr-Physica Co., with which the measurements are made at shear rates of 0.01 to 1000 sec$^{-1}$ and 23° C. The viscosity values at 10 sec$^{-1}$ and 100 sec$^{-1}$ are stated.

The zeta potential and the isoelectric point is determined with an instrument of the DT-1200 type from Dispersion Technology Inc., by the CVI procedure. The titration is performed with KOH/HNO$_3$.

The mean particle size d50 of the aluminium oxide particles in the dispersion is determined by laser diffraction. The instrument Horiba LA-910 (Horiba, Ltd., Japan) is used. The volume-weighted median value from the peak analysis is stated.

The specific surface area is determined as per DIN 66131.

EXAMPLES

Example 1

(according to invention): 34.7 kg of deionised water are placed in a 60 l stainless steel batch vessel. Next, 7.0 kg of AEROXIDE® Alu 65 (BET 65 m$^2$/g), Degussa Co. are sucked in by means of the suction pipe of the Ystral Conti-TDS 3 (stator slits: 4 mm annulus and 1 mm annulus, rotor/stator gap ca. 1 mm) under shear conditions. Further, 13.3 kg of a solution of 1.80 kg of anhydrous citric acid, 1.49 kg of disodium hydrogen phosphate dihydrate and 10 kg of water are added and a further 65.0 kg of AEROXIDE® Alu 65 are sucked in. After completion of the suction, the suction connector is closed and shearing at 3000 RPM is continued for a further 10 mins. After the grinding, 108 g of Acticide® MV, THOR Co., are added as a preservative. This predispersion is passed in two passages through the high energy mill Sugino Ultimaizer HJP-25050 at a pressure of 2500 bar and diamond nozzles of 0.3 mm diameter and thereby intensively further ground.

Figure 2:
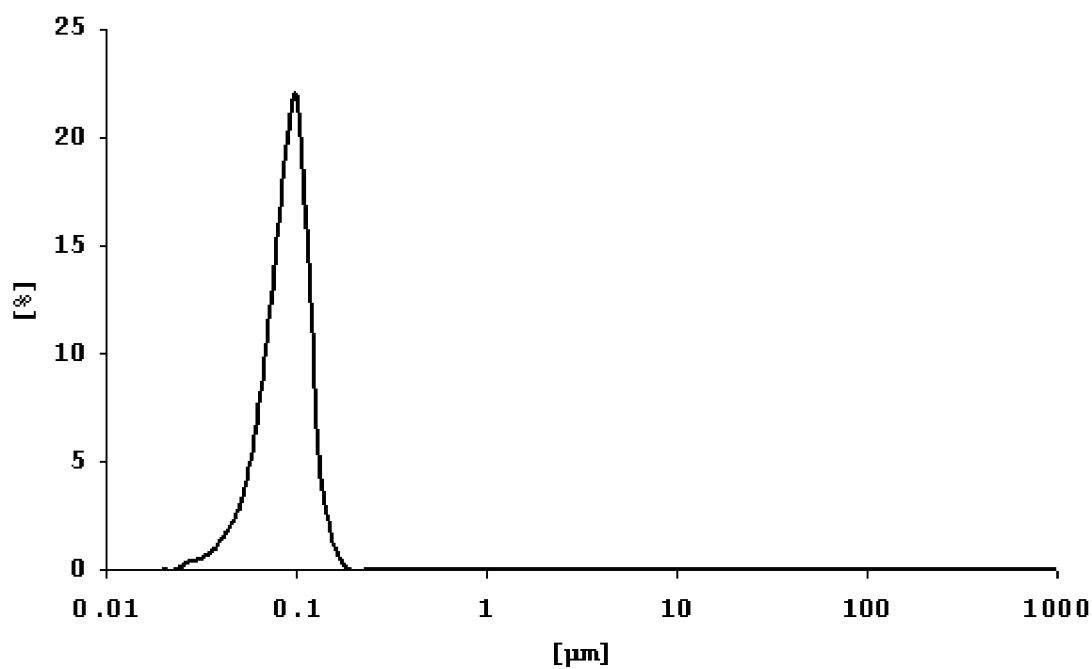

The pH value measured directly after the grinding is 6.0. After ca. 48 hrs, a stable pH value of 7.7 is reached. The solids content of the dispersion is 60 wt. %. FIG. 1 shows the viscosity in mPas as a function of the shear rate in sec$^{-1}$. FIG. 2 shows the occurrence of the aluminium oxide particles as a function of their size in nm. The mean particle size d$_{50}$ is 84 nm. The zeta potential of the dispersion is −28 mV at pH 7.7. The dispersion shows no sign of gelling even after 6 months.

Example 2

(according to invention): 41.1 kg of deionised water are placed in a 60 l stainless steel batch container. Next, 5,8 kg of AEROXIDE® Alu C (BET 100 m$^2$/g), Degussa Co. are sucked in by means of the suction pipe of the Ystral Conti-TDS 3 (stator slits: 4 mm crown and 1 mm crown, rotor/stator gap ca. 1 mm) under shear conditions. Further, 9.80 kg of a solution of 1.70 kg of anhydrous citric acid, 1.42 kg of disodium hydrogen phosphate dihydrate and 6.70 kg of water are added and a further 28.2 kg of AEROXIDE® Alu C are sucked in. After completion of the suction, the suction connector is closed and shearing at 3000 RPM is continued for a further 10 mins. After the grinding, 77 g of Acticide® MV (THOR Co.) are added as preservative. This predispersion is passed in two passages through the high energy mill Sugino Ultimaizer HJP-25050 at a pressure of 2500 bar and diamond nozzles of 0.3 mm and thus intensively further ground.

Figure 3:
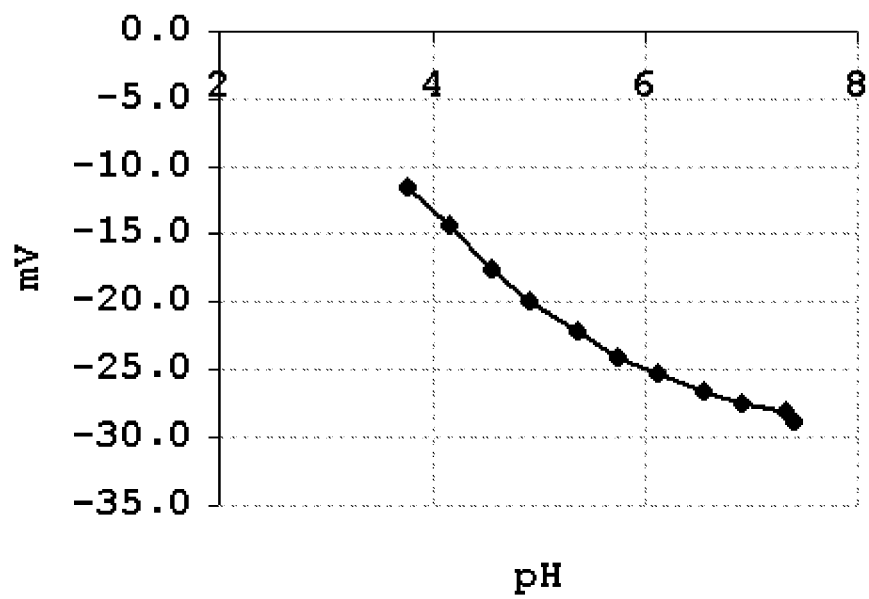
Figure 4:
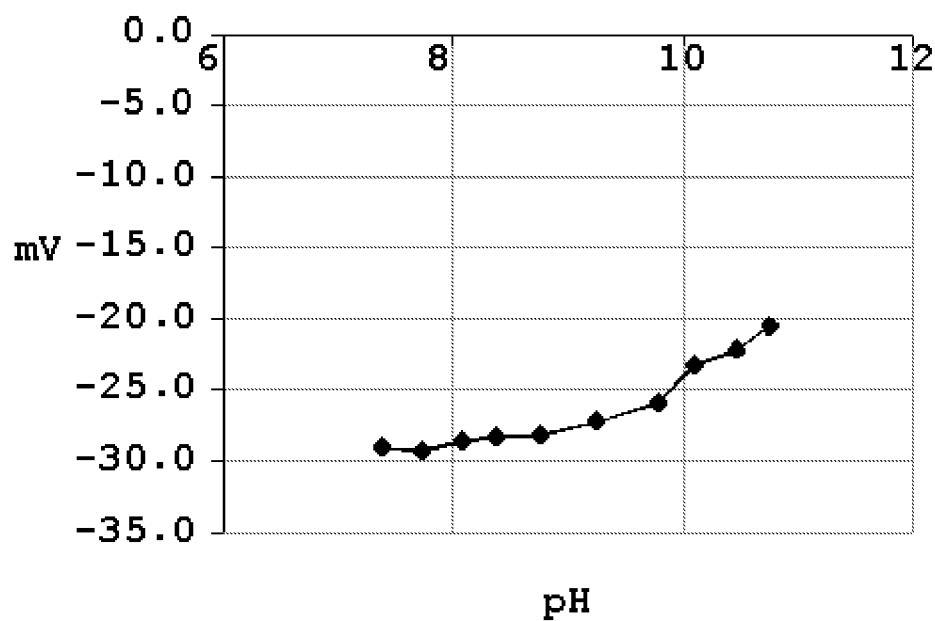

The pH value measured directly after the grinding is 5.8. After ca. 48 hrs, a stable pH value of 7.5 is reached. The solids content of the dispersion is 40 wt. %. FIG. 3 shows the zeta potential in mV as a function of the pH value in the range 3.5 to 7.5. FIG. 4 shows the zeta potential in mV as a function of the pH value in the range 7 to 10.5. The mean particle diameter in the dispersion is 86 nm. The viscosity is about 26 mPas at a shear rate of 10 sec$^{-1}$ and about 24 mPas at 100 sec$^{-1}$. The dispersion shows no sign of gelling even after 6 months.

Example 3

(Comparison Example): 61.0 kg of deionised water are placed in a 60 l stainless steel batch vessel. Next, 26.6 kg of AEROXIDE® Alu C are sucked in by means of the suction pipe of the Ystral Conti-TDS 3 (stator slits: 4 mm crown and 1 mm crown, rotor/stator gap ca. 1 mm) under shear conditions. Further, 0.89 kg of a 50 percent aqueous acetic acid solution are added. After completion of the aspiration, the suction connector is closed and shearing is continued at 3000 RPM for a further 10 mins. After the grinding, 79 g of Acticide® MV (THOR Co.) are added as a preservative. This predispersion is passed in two passages through the high energy mill Sugino Ultimaizer HJP-25050 at a pressure of 2500 bar and diamond nozzles of 0.3 mm diameter and thus intensively further ground.

The pH value measured directly after the grinding is 4.1 and is adjusted to 4.0 with 133 g of 50 percent aqueous acetic acid solution. The solids content of the dispersion is 30 wt. %. The zeta potential shows positive values in the claimed pH range. The mean particle size d$_{50}$ is 86 nm. The viscosity is about 7 mPas at a shear rate of 10 sec$^{-1}$ and about 7 mPas at 100 sec$^{-1}$. The dispersion shows no sign of gelling even after 6 months.

Example 4

(Comparison Example): 52.0 kg of deionised water and 1.19 kg of citric acid monohydrate are placed in a 60 l stainless steel batch vessel and adjusted to a pH of 5.6 with 25 percent caustic soda solution (2.04 kg). Next, 25.5 kg of AEROXIDE® Alu C, Degussa Co. are sucked in by means of the suction pipe of the Ystral Conti-TDS 3 (stator slits: 4 mm crown and 1 mm crown, rotor/stator gap ca. 1 mm) under shear conditions. After completion of the suction, the suction connector is closed and shearing continued at 3000 RPM for a further 10 mins. After the grinding, 85 g of Acticide® MV (THOR Co.) are added as preservative. This predispersion is passed in two passages through the high energy mill Sugino Ultimaizer HJP-25050 at a pressure of 2500 bar and diamond nozzles of 0.3 mm diameter and thus intensively further ground.

The pH value is adjusted to 7.5 with 110 g of 25 percent caustic soda solution. Even after 48 hrs, the pH was unchanged. The Al$_2$O$_3$ content of the dispersion is 31.5 wt. %. The mean particle size d$_{50}$ is 89 nm. The viscosity is about 1245 mPas at a shear rate of 10 sec$^{-1}$ and about 243 mPas at 100 sec$^{-1}$. The dispersion gels after a few days.

The invention claimed is:

1. An aluminum oxide dispersion, which is stable in a pH range from 5 to 9 and has an aluminum oxide content of at least 40 wt. %, obtainable by dispersing one or several aluminum oxide powders with a specific surface area of 5 to 200 m$^2$/g in an aqueous phase, wherein one or several at least dibasic hydroxycarboxylic acids present dissolved in the dispersion and at least one salt of a dialkali metal hydrogen phosphate and/or alkali metal dihydrogen phosphate are added to the aqueous phase each mutually independently in a quantity of 0.3-3×10$^{-6}$ mol/m$^2$ of aluminum oxide specific surface area.

2. The aluminum oxide dispersion according to claim 1, wherein the aluminum oxide powder is of pyrogenic origin.

3. The aluminum oxide dispersion according to claim 1, wherein the aluminum oxide powder in a 4 percent dispersion exhibits a pH value of 3 to 5.

4. The aluminum oxide dispersion according to claim 1, wherein the aluminum oxide particles have a mean aggregate diameter $d_{50}$ of less than 100 nm.

5. The aluminum oxide dispersion according to claim 1, wherein it is free from particles with a diameter of more than 1 μm.

6. The aluminum oxide dispersion according to claim 1, wherein the aluminum oxide content is 40 to 60 wt. %.

7. The aluminum oxide dispersion according to claim 1, wherein the pH value is 6 to 8.

8. The aluminum oxide dispersion according to claim 1, wherein the zeta potential is less than −15 mV.

9. The aluminum oxide dispersion according to claim 8, wherein the zeta potential is in the range of from −25 to −40 mV.

10. The aluminum oxide dispersion according to claim 1, wherein the at least dibasic hydroxy-carboxylic acid present dissolved in the dispersion is citric acid or tartaric acid.

11. The aluminum oxide dispersion according to claim 10, wherein the dibasic hydroxy-carboxylic acid comprises citric acid.

12. The aluminum oxide dispersion according to claim 10, wherein the dibasic hydroxy-carboxylic acid comprises tartaric acid.

13. The aluminum oxide dispersion according to claim 1, which has an isoelectric point at a pH of from about 9 to 10.

14. The aluminum oxide dispersion according to claim 1, which is stable for at least six months.

15. A process for the production of the aluminum oxide dispersion according to claim 1, comprising:

first placing in water one or several at least dibasic hydroxycarboxylic acids present dissolved in the dispersion and at least one salt of a dialkali metal hydrogen phosphate and/or alkali metal dihydrogen phosphate and in a quantity of 0.3-3×10$^{-6}$ mol/m$^2$ specific surface area, adding all at once in portions or continuously the aluminum oxide particles, corresponding to the desired quantity, in the dispersion, and dispersing by an energy input of more than 1000 kJ/m$^3$.

16. The process according to claim 15, wherein the dispersion is firstly performed with an energy input of less than 1000 kJ/m$^3$ with the formation of a predispersion, the predispersion is divided into at least two part streams, said part streams are placed in a high energy mill under a pressure of at least 500 bar, released via a nozzle and allowed to impinge on one another in a gas- or liquid-filled reaction chamber and the high energy grinding is optionally repeated one or several times.

17. A process comprising coating a glass, ceramic or metal surface with the aluminum oxide dispersion according to claim 1.

18. A lacquer produced from the aluminum oxide dispersion according claim 1.

* * * * *